(12) United States Patent
Inayama (10) Patent No.: US 9,482,143 B2
(45) Date of Patent: Nov. 1, 2016

(54) MOTORCYCLE

(71) Applicant: SUZUKI MOTOR CORPORATION, Hamamatsu (JP)

(72) Inventor: Yoshisato Inayama, Hamamatsu (JP)

(73) Assignee: SUZUKI MOTOR CORPORATION, Hamamatsu-shi, Shizouka (JP)

( * ) Notice: Subject to any disclaimer, the term of this patent is extended or adjusted under 35 U.S.C. 154(b) by 0 days.

(21) Appl. No.: 14/512,577

(22) Filed: Oct. 13, 2014

(65) Prior Publication Data

US 2015/0107923 A1 Apr. 23, 2015

(30) Foreign Application Priority Data

Oct. 23, 2013 (JP) ................... 2013-220508

(51) Int. Cl.

| | |
|---|---|
| F01P 5/10 | (2006.01) |
| B60K 11/04 | (2006.01) |
| B62J 35/00 | (2006.01) |
| B62K 11/04 | (2006.01) |
| F02M 35/16 | (2006.01) |
| F01P 11/04 | (2006.01) |

(52) U.S. Cl.
CPC .............. F01P 5/10 (2013.01); B60K 11/04 (2013.01); B62J 35/00 (2013.01); B62K 11/04 (2013.01); F01P 11/04 (2013.01); F02M 35/162 (2013.01)

(58) Field of Classification Search
CPC ........ F01P 5/10; F01P 5/12; F01P 2005/105; F01P 2005/125; F02M 35/162; B60K 11/04; B62J 35/00

USPC ............ 123/41.01, 41.81, 41.82 R; 180/229
See application file for complete search history.

(56) References Cited

U.S. PATENT DOCUMENTS

| 2,619,909 | A | * | 12/1952 | Cassa | F01P 5/10 |
| | | | | | 415/180 |
| 4,996,952 | A | * | 3/1991 | Hall | F01P 5/12 |
| | | | | | 123/198 C |
| 5,762,130 | A | * | 6/1998 | Uibel | F01P 11/0276 |
| | | | | | 123/41.54 |
| 2005/0217646 | A1 | * | 10/2005 | Moller | F16D 33/06 |
| | | | | | 123/559.1 |
| 2012/0247410 | A1 | * | 10/2012 | Mukouhara | F01P 5/10 |
| | | | | | 123/41.47 |

FOREIGN PATENT DOCUMENTS

| JP | 08114124 A | * 5/1996 |
| JP | 2007-040297 | 2/2007 |

* cited by examiner

*Primary Examiner* — Joseph Rocca
*Assistant Examiner* — Felicia L Brittman
(74) *Attorney, Agent, or Firm* — Troutman Sanders LLP (57) ABSTRACT

A water pump is disposed so as to be mounted on a cylinder head cover of an engine. An electric motor is disposed continuously from the water pump. The water pump sends cooling water to a water jacket of a cylinder block via a cooling water pipe disposed so as pass in front of the cylinder head cover and a cylinder head. In an upper end portion of a radiator, an inlet through which the cooling water is led from the engine is disposed on the left and an outlet through which the cooling water is supplied to the water pump is disposed on the right. The inlet is connected to the cylinder block via a cooling water pipe, and the outlet is connected to the water pump via a cooling water pipe.

5 Claims, 8 Drawing Sheets

MOTORCYCLE

CROSS-REFERENCE TO RELATED APPLICATIONS

This application is based upon and claims the benefit of priority of the prior Japanese Patent Application No. 2013-220508, filed on Oct. 23, 2013, the entire contents of which are incorporated herein by reference.

BACKGROUND OF THE INVENTION

Field of the Invention

The present invention relates to a motorcycle including a water pump forming a cooling system of an internal combustion engine. (In this application, it is simply called an "engine".)

Description of the Related Art

A water-cooled engine mounted on a motorcycle is equipped with a water pump forming a cooling system of the engine. In the cooling system of the engine, the water pump leads cooling water to a radiator through a cooling water passage provided in a cylinder, a cylinder head, and so on. The cooling water cooled in the radiator is returned to the water pump again.

As a motorcycle of this type, Patent Document 1, for example, discloses a structure in which a water pump is disposed on a lower portion of an engine (on a right side of a crankcase) and the water pump is coupled to a crank of the engine to be driven.

[Patent Document 1] Japanese Laid-open Patent Publication No. 2007-40297

However, providing the water pump on the crankcase accordingly increases the size of the crankcase.

Further, if the water pump is provided on the crankcase, cooling water pipes connecting the water pump to a radiator and a cylinder need to extend up to the crankcase located on a lower portion of a vehicle body. Accordingly, the cooling water pipes extend up and down around the engine, and in particular in a vehicle having an exposed engine, the cooling water pipes are exposed, which spoils the beauty of the outer appearance. Further, when the cooling water pipes become long, a volume of the cooling water accordingly increases.

SUMMARY OF THE INVENTION

The present invention was made in consideration of the aforesaid problems and has an object to realize a compact crankcase and prevent an increase of the length of a cooling water pipe connected to a water pump to thereby suppress the exposure of the cooling water pipe.

A motorcycle of the present invention includes: an engine having a crankcase, a cylinder, and a cylinder head; a water pump which sends cooling water to the engine; and a radiator which radiates heat of the cooling water led from the engine and supplies the resultant cooling water to the water pump, wherein the water pump is disposed higher than the crankcase.

Another characteristic of the motorcycle of the present invention is that the water pump is disposed above the cylinder head.

Another characteristic of the motorcycle of the present invention is that, in an upper end portion of the radiator, an inlet through which the cooling water is led from the engine and an outlet through which the cooling water is supplied to the water pump are both disposed.

Another characteristic of the motorcycle of the present invention is that it further includes: a steering head pipe; a main frame joined to a rear portion of the steering head pipe and bifurcated rearward into a pair of left and right parts; and a fuel tank mounted above the bifurcated main frame, and the water pump is disposed at a position that is under the fuel tank and between the left and right parts of the bifurcated main frame.

Another characteristic of the motorcycle of the present invention is that it further includes a driving source exclusively for driving the water pump.

Another characteristic of the motorcycle of the preset invention is that it further includes: an air cleaner which takes in air for combustion; a supercharger which compresses the sucked air for combustion; and a pipe connecting the air cleaner and the supercharger, and the supercharger is disposed on a front lower portion of the engine, and the air cleaner is disposed on a lower portion of a vehicle body.

DETAILED DESCRIPTION OF THE PREFERRED EMBODIMENTS

Hereinafter, a suitable embodiment of the present invention will be described with reference to the attached drawings.

Figure 1:
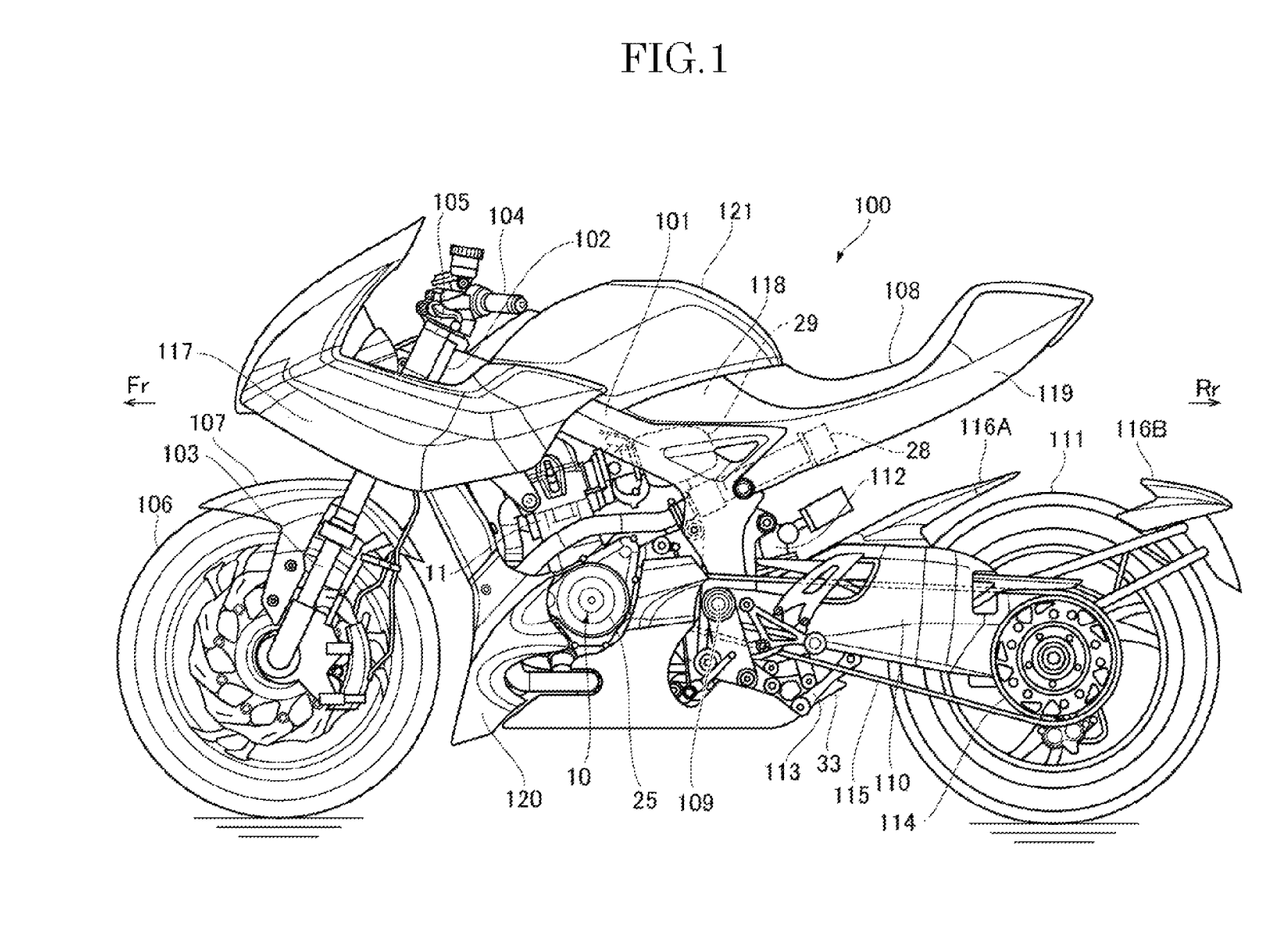
FIG. 1 is a side view of a motorcycle according to an embodiment.
Figure 2:
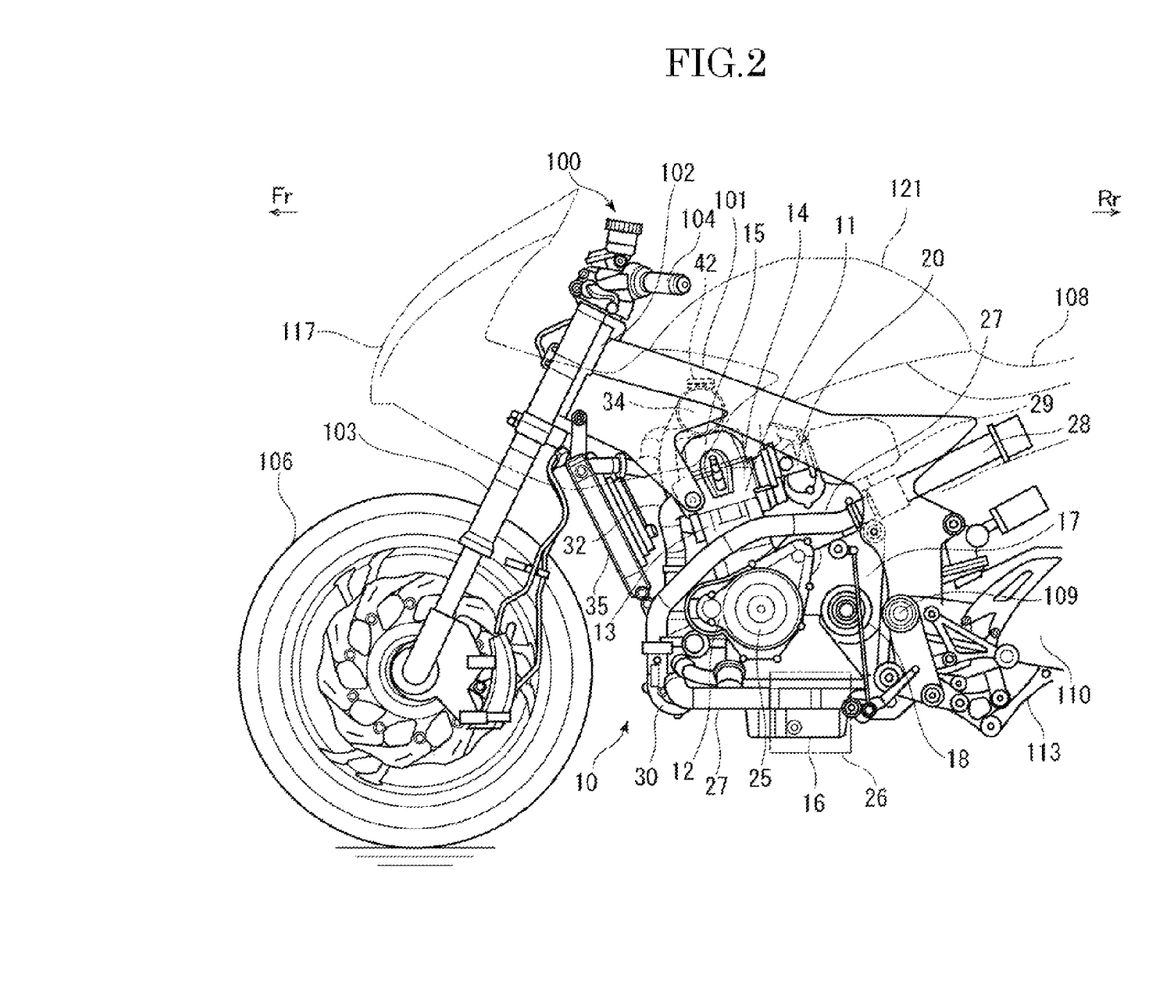
FIG. 2 is a side view of the motorcycle according to the embodiment, with exterior parts being removed.
Figure 3:
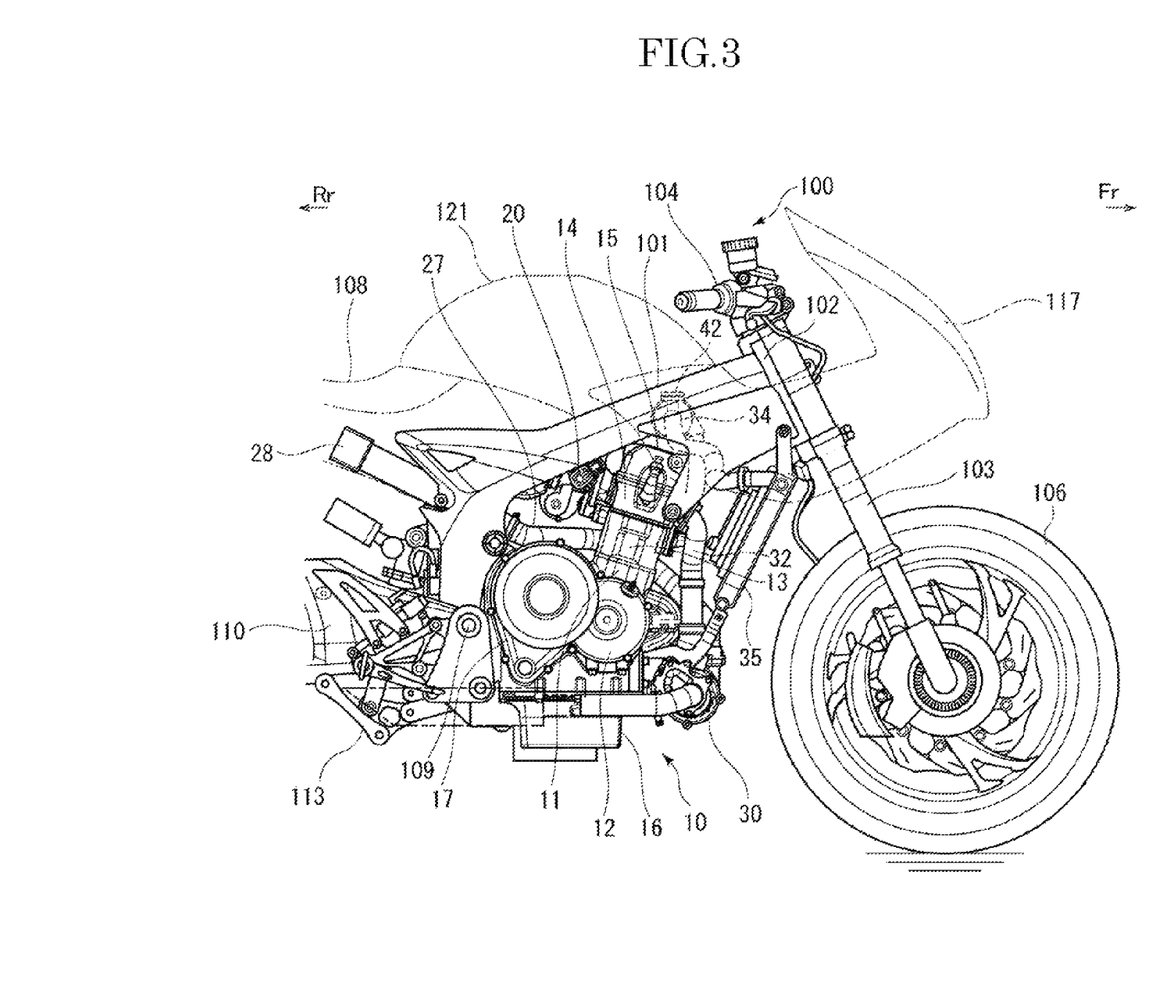
FIG. 3 is a side view of the motorcycle according to the embodiment, with the exterior parts being removed.

FIG. 1 to FIG. 3 illustrate a schematic structure of a motorcycle 100 as an application example of the present invention. FIG. 1 is a side view of the whole vehicle, and FIG. 2 and FIG. 3 are side views thereof, with exterior parts being removed. First, the whole structure of the motorcycle 100 will be described by using these drawings. Note that in the drawings used in the description below including FIG. 1 to FIG. 3, a front direction, a rear direction, a right side direction, and a left side direction of the vehicle are indicated by an arrow Fr, an arrow Rr, an arrow R, and an arrow L respectively when necessary.

In FIG. 1 to FIG. 3, on a front portion of a body frame 101 (main frame) made of steel or an aluminum alloy material, two left and right front forks 103 which are supported by a steering head pipe 102 so as to be pivotable left and right are provided. On upper ends of the front forks 103, a handlebar 104 is fixed via a steering bracket 105. On lower portions of the front forks 103, a front wheel 106 is rotatably supported and a front fender 107 is fixed so as to cover an upper portion of the front wheel 106.

The body frame 101 is integrally joined to a rear portion of the steering head pipe 102 and bifurcates rearward into a pair of left and right parts, and the body frame 101 extends from the steering head pipe 102 rear downward while fanning out. In this example, the body frame 101 may be what is called a twin-spar frame which is adopted as being suitable for vehicles requiring high speed performance. Incidentally, a seat rail, not illustrated, extends rearward from the vicinity of a rear portion of the body frame 101 while moderately inclining rear upward, to support a seat 108 (seating seat). Further, the left and right parts of the body frame 101 join to each other while curving or bending downward at the vicinity of rear end portions thereof, so that the whole body frame 101 has a three-dimensional structure having space inside.

A swing arm 110 is coupled to the vicinity of a lower side of a rear end of the body frame 101 via a pivot shaft 109 so as to be swingable up and down. A rear wheel 111 is rotatably supported on a rear end of the swing arm 110. In this example, the rear wheel 111 is supported on a rear portion side of the swing arm 110 in a cantilever manner. A rear shock absorber 112 is mounted between the body frame 101 and the swing arm 110, and especially a lower end side of the rear shock absorber 112 is coupled both to the body frame 101 and the swing arm 110 via a link mechanism 113. A driven sprocket 114 around which a chain 115 for transmitting motive power of a later-described engine is wound is fit to the rear wheel 111, and the rear wheel 111 is driven to rotate via the driven sprocket 114. In an immediate periphery of the rear wheel 111, rear fenders 116A, 116B covering the vicinity of a front upper portion and the vicinity of a rear upper portion of the rear wheel 111 are provided.

In the vehicle exterior, mainly a front portion and left and right side portions of the vehicle are covered by cowlings, in this example, by a half cowl 117 and side cowls 118 respectively. Further, in a vehicle rear portion, a seat cover or a seat cowl 119 covers a periphery of the seat 108. Further, there is provided an under cowl covering a periphery of a lower portion of the engine, and by these exterior members, a vehicle outer form having what is called a streamlined shape is formed. Incidentally, in front of the seat 108, a fuel tank 121 is mounted above the body frame 101.

Figure 4:
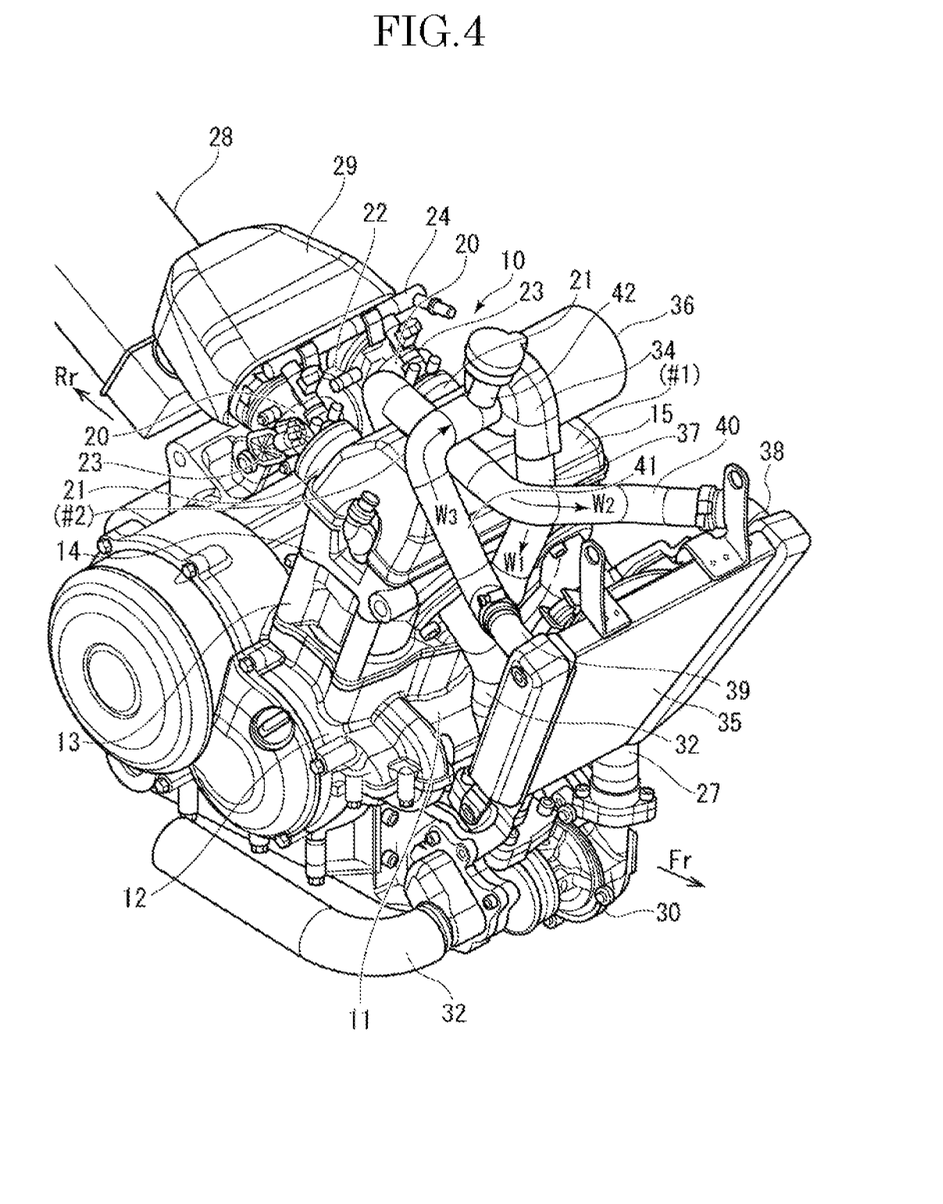
FIG. 4 is a perspective view illustrating an engine unit according to the embodiment.
Figure 5:
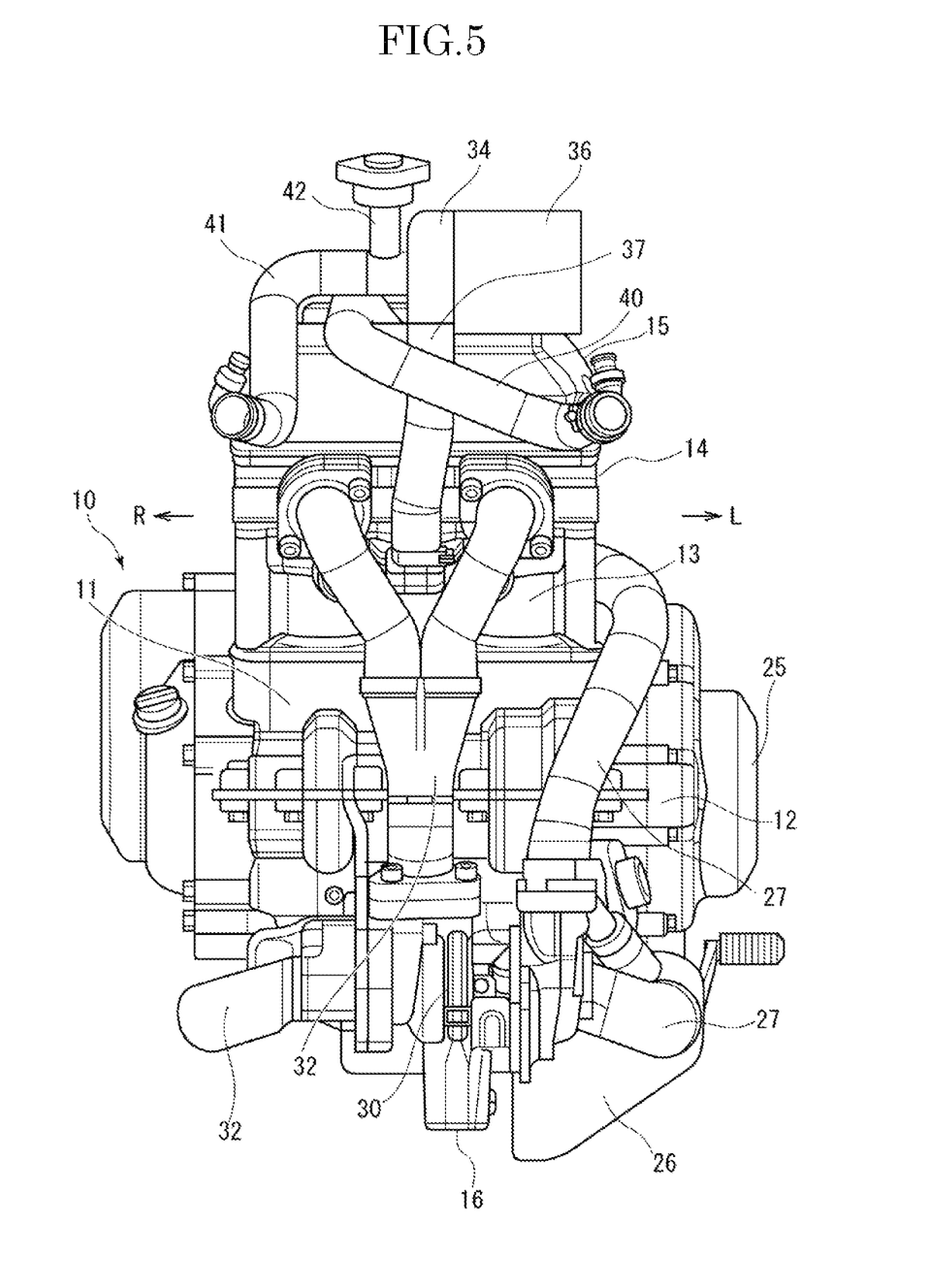
FIG. 5 is a front view of the vicinity of the engine unit according to the embodiment.
Figure 6:
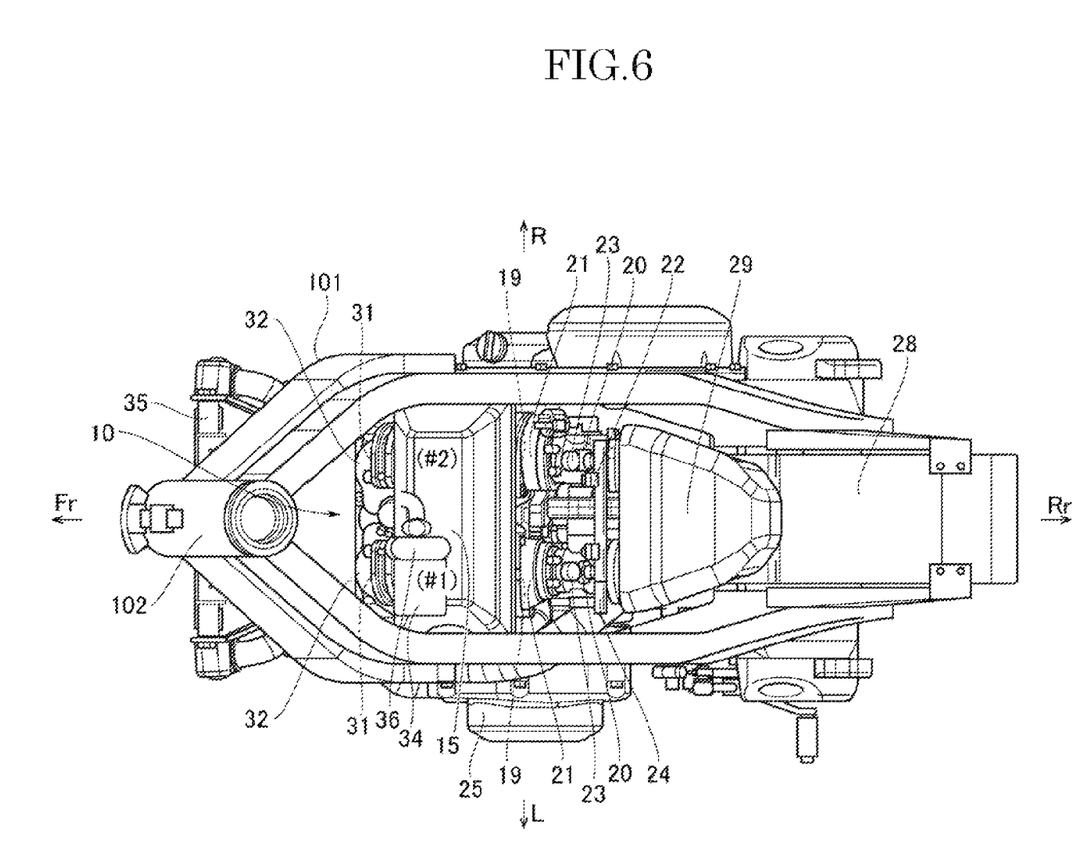
FIG. 6 is a top view of the vicinity of the engine unit according to the embodiment.

An engine unit 10 is mounted at a substantially center portion of the motorcycle 100. FIG. 4 illustrates the structure of an essential part of the engine unit 10. Hereinafter, the engine unit 10 will be described with reference to FIG. 4 to FIG. 8. The engine unit 10 has an engine 11 and in this embodiment, a water-cooled multicylinder four-cycle gasoline engine is used. The engine 11 is a parallel two-cylinder engine where a first (#1) cylinder and a second (#2) cylinder are disposed side by side on the left and right (in a vehicle width direction). In the engine 11, above a crankcase 12 housing a crankshaft which extends in a right and left direction to be horizontally supported, cylinders 13, a cylinder head 14, and a cylinder head cover 15 are integrally joined so as to be stacked sequentially (refer to FIG. 4), and an oil pan 16 is attached to a lowest portion of the engine 11. Note that a cylinder axis of the engine 11 is moderately inclined forward, and the oil pan 16 is disposed substantially along a front and rear direction at a substantially center in terms of the vehicle width direction (refer to FIG. 7) and projects downward from a bottom portion of the crankcase 12. Such an engine 11 is suspended on the body frame 101 via a plurality of engine mounts, thereby integrally joined to and supported by an inner side of the body frame 101, and the engine 11 itself works as a rigid member of the body frame 101.

On a rear portion of the crankcase 12, a transmission case 17 is integrally formed (refer to FIG. 2), and in the transmission case 17, a counter shaft and a plurality of transmission gears, not illustrated, are disposed. The motive power of the engine 11 is transmitted from the crankshaft through a transmission finally to a drive sprocket 18 being its output end, and by this drive sprocket 18, the driven sprocket 114, as a result, the rear wheel 111 is driven to rotate via the chain 115 for power transmission (refer to FIG. 1).

Note that the crankcase 12 and the transmission case 17 are joined integrally to each other and as a whole form a casing assembly of the engine 11. A plurality of auxiliary machines such as a starter motor for engine startup and a clutch device are mounted on or joined to appropriate places of this casing assembly, and the whole engine unit 10 including these is supported by the body frame 101.

The engine 11 is further provided with an intake system which supplies an air-fuel mixture made of the air (intake air) and a fuel which are supplied from an air cleaner and a fuel supply device (these will be described later) respectively, an exhaust system which discharges exhaust gas after combustion from the engine 11, a lubricating system which lubricates movable parts of the engine 11, a cooling system which cools the engine 11, and a control system (ECU; Engine Control Unit) which controls the operations of the aforesaid systems. Based on the control by the control system, the plural functional systems operate in cooperation with the aforesaid auxiliary machines and so on, so that a smooth operation is executed as the whole engine unit 10.

More concretely, first in the intake system, both the #1 and #2 cylinders have intake ports 19 (their rough positions are depicted by the dotted lines in FIG. 6) which are opened in a rear side of the cylinder head 14, and throttle bodies 20 are connected to the intake ports 19 via intake pipes 21. Throttle valves (not illustrated) which open/close intake air flow paths or passages formed inside the throttle bodies 20 according to an accelerator opening degree are fitted to the throttle bodies 20, whereby a flow rate of the air for combustion fed from the later-described air cleaner is controlled. In this example, throttle valve shafts of the #1 and #2 cylinders are disposed coaxially, and a valve driving mechanism 22 which electrically or electromagnetically drives the throttle valve shafts is provided.

In the throttle bodies 20, injectors 23 for fuel injection are disposed on a downstream side of the throttle valves, and the fuel in the fuel tank 121 is supplied to these injectors 23 by a fuel pump. In this case, upper sides of the injectors 23 are connected to a delivery pipe 24 suspended laterally in the vehicle width direction, so that the fuel is distributed to the injectors 23 from the delivery pipe 24 connected to the fuel pump. The injectors 23 inject the fuel to the intake air flow paths in the throttle bodies 20 at a predetermined timing by being controlled by the aforesaid control system. Consequently, the air-fuel mixture with a predetermined air-fuel ratio is supplied to the cylinders 13 of the #1 and #2 cylinders.

Figure 7:
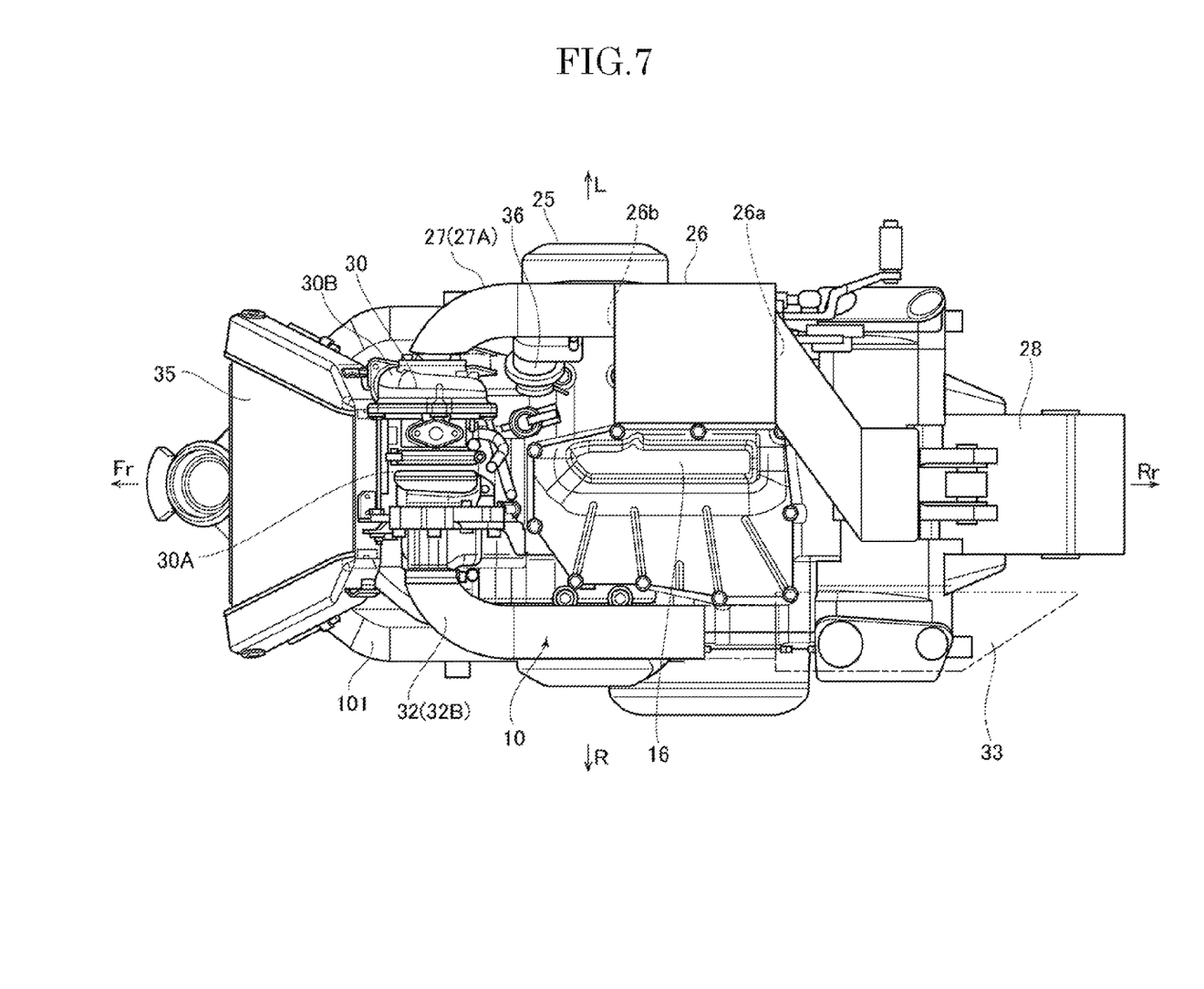
FIG. 7 is a bottom view of the vicinity of the engine unit according to the embodiment.
Figure 8:
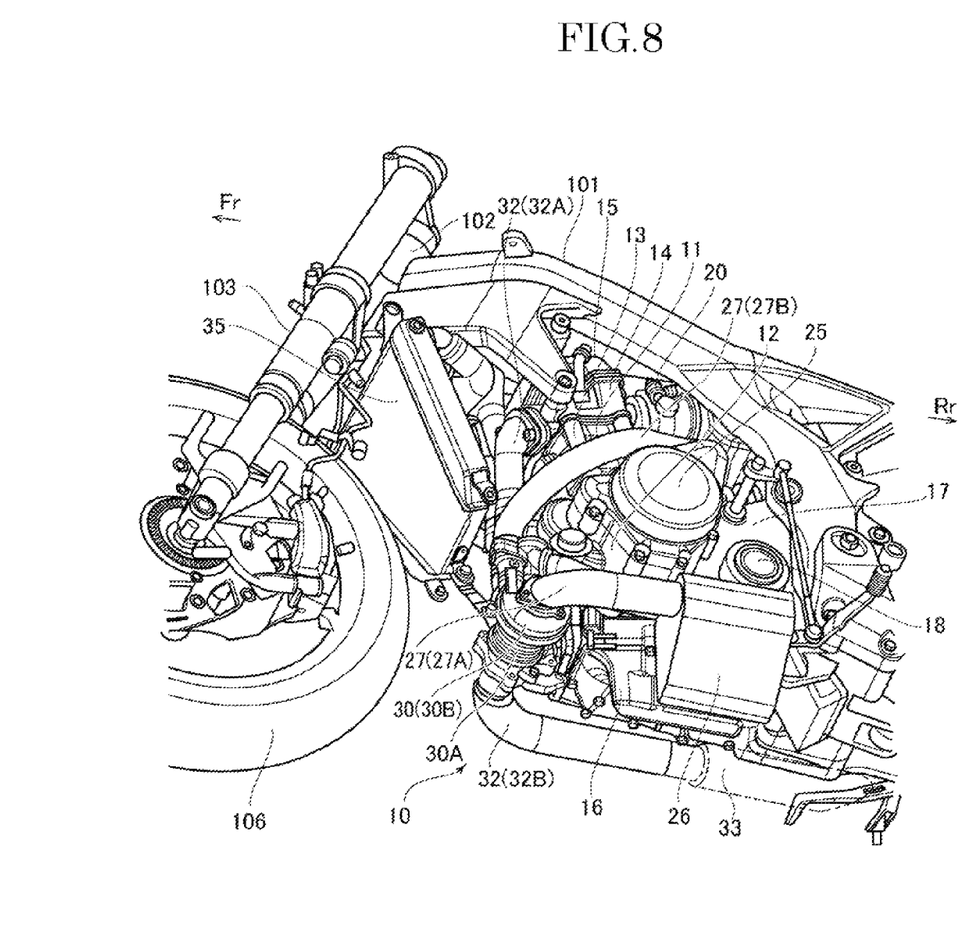
FIG. 8 is a perspective view of a front portion of the motorcycle according to the embodiment seen from under.

Here, as illustrated in FIG. 7 and FIG. 8, on a lower portion of the engine 11, that is, under a magneto chamber 25 provided on the left of the crankcase 12, the air cleaner 26 is adjacently disposed on the left of the oil pan 16 with a predetermined interval. The air cleaner 26 has a box-shaped casing whose left side surface is inclined more inward as it goes downward, and an air filter is fit in the casing, and the air taken into the casing is cleaned by the air filter. In the air cleaner 26, an inlet port 26a for taking in the air is opened in a casing rear surface portion and an outlet port 26b of the cleaned air is opened in a casing front surface portion (their rough positions are depicted by the dotted lines in FIG. 7), and an air feed pipe 27 is connected to the outlet port 26b. The air feed pipe 27 extends forward from the air cleaner 26 to go round to the front of the crankcase 12, thereafter curves upward, further passes on the left of the cylinder 13 (#1 cylinder), and is connected to, in this example, an air-cooling intercooler 28. Incidentally, an air duct, whose detailed illustration is omitted, is provided to lead cooling air to the intercooler 28.

The intercooler 28 cools the air supplied from the air feed pipe 27, and the cooled air is supplied to the throttle bodies 20 of the #1 and #2 cylinders via a surge tank 29. This example includes a supercharger 30 (turbocharger) which is disposed in the middle of the air feed pipe 27 in the intake system, that is, in front of the engine 11 and compresses the intake air. The air compressed by a compressor of the supercharger 30 generates heat and therefore if this air is used as it is, intake efficiency of the engine 11 deteriorates. By cooling the air supplied from the supercharger 30 by the intercooler 28 on an intake upstream side of the throttle bodies 20, it is possible to effectively improve the intake efficiency.

In the exhaust system, the #1 and #2 cylinders both have exhaust ports 31 (their rough positions are depicted by the dotted lines in FIG. 6) which are opened in a front side of the cylinder head 14, and exhaust pipes 32 are connected to the exhaust ports 31. The exhaust pipes 32 of the respective cylinders once extend downward from the exhaust ports 31 and join together in front of the cylinders 13 to be integrated. The exhaust pipe 32 thereafter extends around to a right lower portion of the crankcase 12 and further extends rearward as illustrated in FIG. 7. A muffler 33 (part thereof is illustrated in FIG. 1) is attached to a rear end of the exhaust pipe 32. In this example, in the middle of the exhaust pipe 32, a driving portion side of the supercharger 30, that is, a turbine is disposed, and the compressor of the supercharger 30 driven to rotate by this turbine is disposed in the middle of the air feed pipe 27. Thus, this embodiment adopts the turbocharger which pressurizes the air sent from the air cleaner 26 by utilizing an exhaust stream of the engine 11 and supplies the pressurized air to the intercooler 28.

Here, basic operations and so on of the intake system will be described. First, by providing the supercharger 30, it is possible to realize a practical reduction of an exhaust amount and an improvement of intake efficiency of the engine 11 at the same time. In this case, by the intercooler 28 cooling the air pressurized by the supercharger 30, deterioration of the intake efficiency is prevented, and an improvement of fuel efficiency and a power increase are realized.

In addition to the above, disposing the intercooler 28 adjacent to the surge tank 29 can shorten an air route therebetween to improve throttle response. Further, this can decrease the number of pipes, resulting in a weight reduction and a reduction of the number of parts. Further, disposing the intercooler 28 at the back of the engine 11 can facilitate the layout in an area in front of the engine 11 where the radiator 35, the exhaust pipes 32, and the supercharger 30 (mainly in the case of the turbo) are disposed.

Moreover, disposing the supercharger 30 more forward than the intercooler 28 can shorten and simplify the pipes since this means that the supercharger 30 is disposed near the engine 11 and can concentrate intake system parts. Further, since the weight of the parts concentrates on the vehicle body center portion, operability of the vehicle improves. In this example, the supercharger 30 being what is called a turbo which compresses the intake air by utilizing the exhaust stream needs to be disposed in front of the engine 11 so as to be adjacent to the exhaust pipe 32 extending from the front side of the cylinders 13, but disposing the intercooler 28 at the back facilitates the layout in the area in front of the engine 11.

Further, in the intercooler 28, the inlet and outlet ports of the air are located on one side (front half portion of the vehicle body) and its internal air flow path is in a substantially U-shape, though detailed illustration thereof is omitted. Accordingly the air flow path is folded back inside the intercooler 28, and as compared with a case where a folded U-pipe is provided, it is possible to set the area of the intercooler 28 wider by an occupation area of the conventional U-pipe. Consequently, limited room or space under the seat 108 can be used to the full, which improves cooling efficiency of the intake air and in addition enables a reduction of the number of parts.

Further, the intercooler 28 is located under the seat 108 and at least part thereof is located more rearward than a front end of the seat 108. Therefore, since the intercooler 28 generating high-temperature exhaust heat air is disposed under (directly under or at the back) of the seat 108, the exhaust heat air does not easily hit against a passenger as compared with a case where the intercooler 28 is disposed in front of the seat 108, which improves comfortability of the passenger.

Next, the lubricating system to which lubricating oil is supplied includes valve driving devices formed in the crankshaft and the cylinder head 14, cam chains coupling them, a transmission, and so on, though they are not illustrated. In this embodiment, an ordinary oil pump is used for the lubricating system, and the lubricating oil pumped up from the oil pan 16 is sent to the lubricating system by this oil pump.

Next, in the cooling system, a water jacket, not illustrated, is formed around a cylinder block including the cylinders 13 so as to make the cooling water circulate therein.

Further, above the cylinder head 14, a water pump 34 is disposed so as to be mounted on the cylinder head cover 15. An electric motor 36 being a driving source exclusive for the water pump 34 is disposed continuously from the water pump 34. As illustrated in FIG. 4, the water pump 34 sends (refer to the arrow $w_1$) the cooling water to the water jacket of the cylinder block via a cooling water pipe 37 disposed so as to pass in front of the cylinder head cover 15 and the cylinder head 14. The water pump 34 and the electric motor 36 thus structured are disposed on the cylinder head cover 15 so as to be deviated to the left and are located at a position that is under the fuel tank 121 and between the left and right parts of the bifurcated body frame 101. Consequently, the water pump 34 is disposed so as to be hidden, resulting in a good outer appearance around the engine 11.

Further, the radiator 35 is supported on the front portion of the engine unit 10 by utilizing the body frame 101 and so on. The radiator 35 radiates the heat of the cooling water led from the water jacket of the cylinder block by receiving the travelling air and thereafter supplies the cooling water to the water pump 34. The radiator 35 has a trapezoidal shape whose upper base is longer than the lower base as illustrated in FIG. 7 and FIG. 8, and extends from the vicinity of a lower end of the steering head pipe 102 up to the vicinity of a front side of the crankcase 12 while moderately inclining rearward as illustrated in FIG. 2 and FIG. 3. A front surface of the cylinder block of the engine 11 is substantially covered by the radiator 35.

As illustrated in FIG. 4, in an upper end portion of the radiator 35, an inlet 38 through which the cooling water is led from the engine 11 (refer to the arrow w2) is disposed on the left and an outlet 39 through which the cooling water is supplied to the water pump 34 (refer to the arrow w3) is disposed on the right.

The inlet 38 of the radiator 35 is connected to the cylinder block via a cooling water pipe 40. Above the cylinder head cover 15, the cooling water pipe 40 extends forward from a rear portion of the cylinder block, gently curves left downward, passes in front of the cooling water pipe 37, and is connected to the inlet 38 of the radiator 35.

Further, the outlet 39 of the radiator 35 is connected to the water pump 34 via a cooling water pipe 41. Above the cylinder head cover 15, the cooling water pipe 41 extends in the right direction from the water pump 34, passes above the cooling water pipe 40, curves front downward, and is connected to the outlet 39 of the radiator 35.

Here, the water pump 34 is located higher than the radiator 35 and is located at the highest position in the cooling system. A fill port 42 from which the cooling water is injected is disposed in the water pump 34 located at the highest position in the cooling system or in a connection portion between the water pump 34 and the cooling water pipe 41.

As described above, the supercharger 30 is located on the front lower portion of the engine 11, and the air cleaner 26 is disposed on the vehicle body lower portion so as to be located near the supercharger 30. Consequently, space is reserved in an area under the fuel tank 121 and above the engine 11 where an air cleaner is often disposed conventionally, and the water pump 34 is disposed in this area.

By thus disposing the water pump 34 higher than the crankcase 12 of the engine 11, it is possible to shorten the width and the back and forth length of the crankcase 12. Further, there is no need to extend the cooling water pipes 37, 41 connected to the water pump 34 up to the crankcase 12, which reduces the exposure of the cooling water pipes 37, 41, leading to a good outer appearance around the engine 11. Further, since it is possible to shorten the cooling water pipes 37, 41, it is possible to reduce a volume of the cooling water to efficiently circulate the cooling water.

Especially by disposing the water pump 34 above the cylinder head 14 (on the cylinder head cover 15) as in the above-described embodiment, it is possible to reduce the width of the whole engine 11, which can shorten the vehicle width even when the engine is of a parallel multicylinder type.

Further, also because the inlet 38 and the outlet 39 are both disposed in the upper end portion of the radiator 35, the cooling water pipes 40, 41 connected to the radiator 35 can be concentrated above the engine unit 10. Consequently, it is possible to shorten the cooling water pipes 40, 41 and in addition, make them almost unseen from the outside, resulting in a good outer appearance around the engine unit.

Further, by providing the driving source exclusively for the water pump 34, it is possible to enhance a degree of freedom in disposing the water pump as compared with a conventional type where motive power of a water pump is taken from any of rotating shafts of an engine. Further, it is possible to reduce the number of parts for taking the motive power from the engine and can make the engine compact. Further, since the power of the engine is not reduced, it is possible to avoid deterioration of motive power performance.

Further, in the case of the vehicle where the supercharger is located on a front lower side of the engine, by providing the air cleaner under the vehicle body and disposing the water pump in the area near the upper portion of the cylinder head under the fuel tank, in which area the air cleaner is conventionally disposed, it is possible to shorten both the intake pipes and the cooling water pipes, resulting in a simple structure, which improves maintainability and achieves a good outer appearance.

In the foregoing, the present invention is described together with various embodiments, but the present invention is not limited only to these embodiments, and changes and so on can be made within the scope of the present invention.

In the above-described embodiment, a description is given, taking the water-cooled parallel two-cylinder engine as an example, but the number of cylinders, a cooling method, and so on of the engine 11 are appropriately selectable, and the present invention is also applicable to, for example, an air-cooled engine with three cylinders or more.

According to the present invention, by disposing the water pump higher than the crankcase of the engine, it is possible to shorten the width and the back and forth length of the crankcase. Further, there is no need to extend the cooling water pipes connected to the water pump up to the crankcase, which reduces the exposure of the cooling water pipes, resulting in a good outer appearance around the engine. Further, since the cooling water pipes can be shortened, it is possible to reduce the volume of the cooling water to efficiently circulate the cooling water.

What is claimed is:

1. A motorcycle comprising:
   an engine having a crankcase, a cylinder, and a cylinder head disposed higher than the crankcase;
   a water pump which sends cooling water to the engine; and
   a radiator which radiates the heat of the cooling water led from the engine and supplies the resultant cooling water to the water pump,
   wherein the water pump is disposed above the cylinder head and located higher than the radiator, and
   wherein a pipe connecting the water pump and the radiator is disposed to fall toward the radiator from the water pump.

2. The motorcycle according to claim 1, further comprising an upper end portion of the radiator, the upper end portion of the radiator comprising an inlet through which the cooling water is led from the engine and an outlet through which the cooling water is supplied to the water pump.

3. The motorcycle according to claim 1, further comprising:
   a steering head pipe;
   a main frame joined to a rear portion of the steering head pipe and bifurcated rearward into a pair of left and right parts; and
   a fuel tank mounted above the bifurcated main frame,
   wherein the water pump is disposed at a position that is under the fuel tank and between the left and right parts of the bifurcated main frame.

4. The motorcycle according to claim 1, further comprising a driving source exclusively for driving the water pump.

5. The motorcycle according to claim 1, further comprising:
   an air cleaner which takes in air for combustion;
   a supercharger which compresses the incoming air for combustion; and
   a pipe connecting the air cleaner and the supercharger,
   wherein the supercharger is disposed on a front lower portion of the engine, and
   wherein the air cleaner is disposed on a vehicle body lower portion.

* * * * *